Oct. 21, 1952 W. H. CARTER 2,614,518
VESSEL RAISING APPARATUS
Filed Oct. 15, 1946 4 Sheets-Sheet 2
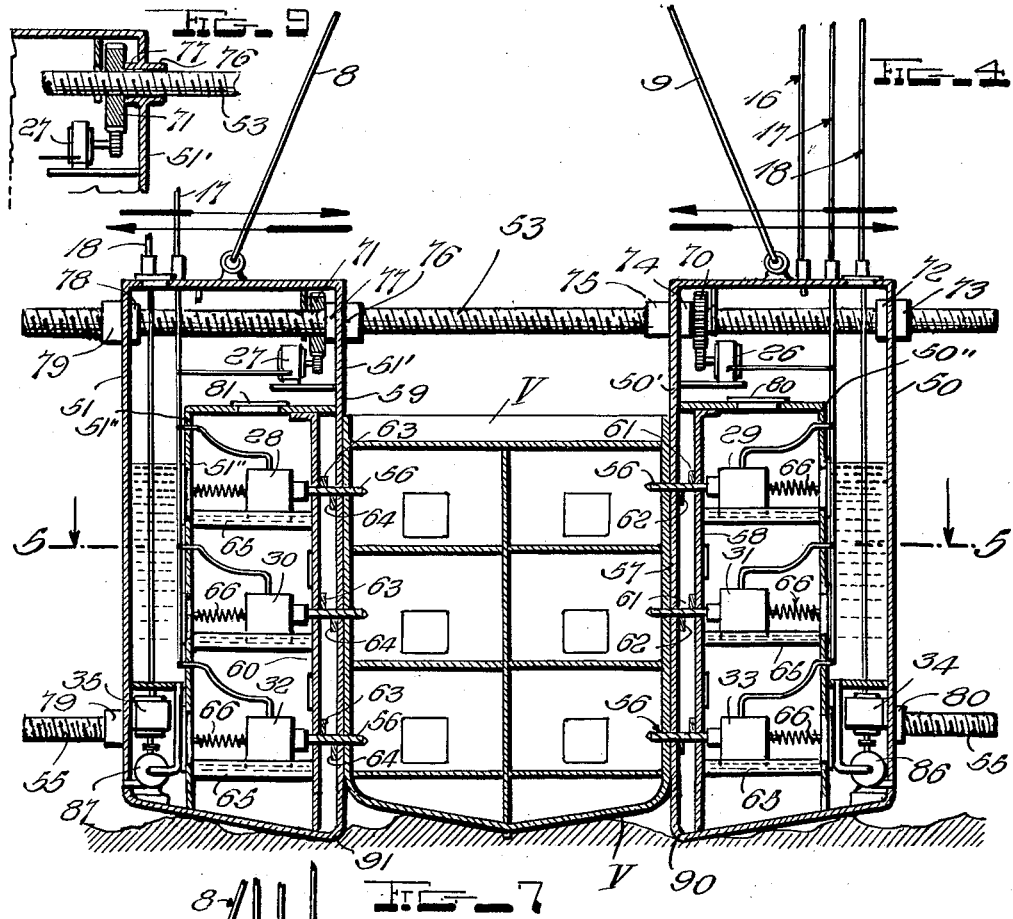
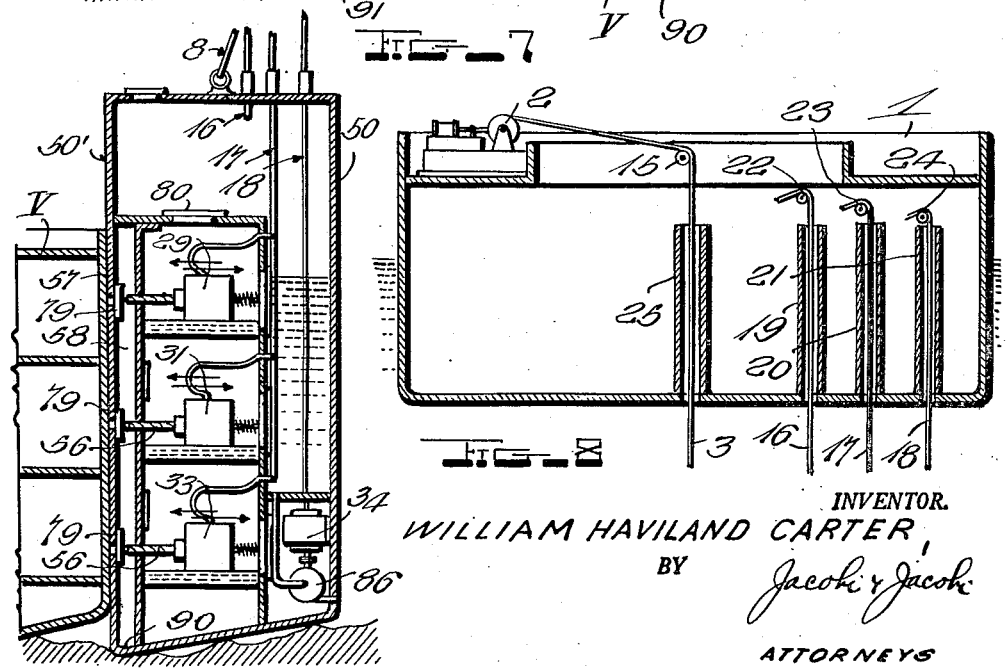
INVENTOR.
WILLIAM HAVILAND CARTER,
BY
Jacobi & Jacobi
ATTORNEYS Oct. 21, 1952 W. H. CARTER 2,614,518
VESSEL RAISING APPARATUS
Filed Oct. 15, 1946 4 Sheets-Sheet 3

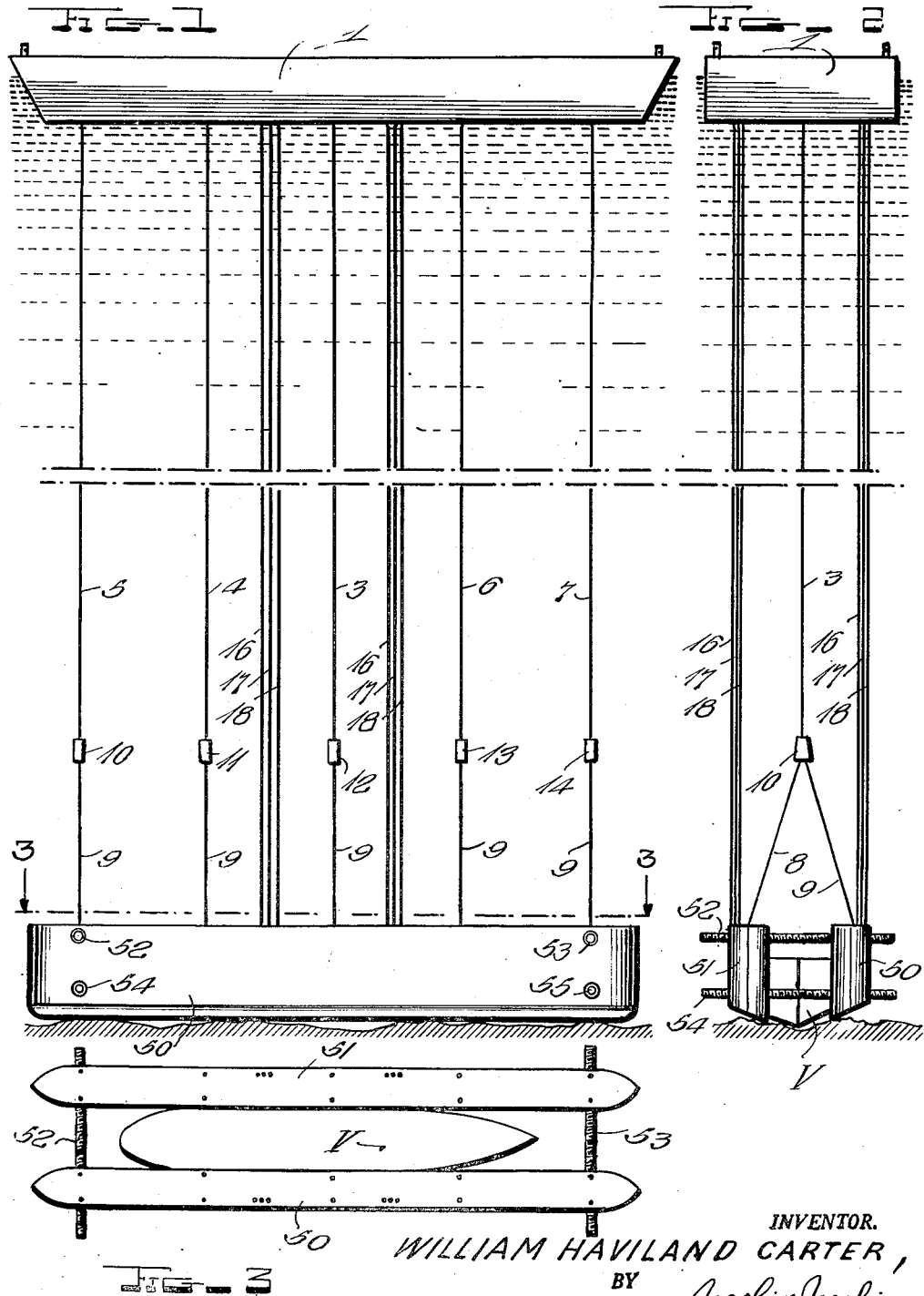

INVENTOR
WILLIAM HAVILAND CARTER,
BY Jacobi & Jacobi
ATTORNEYS

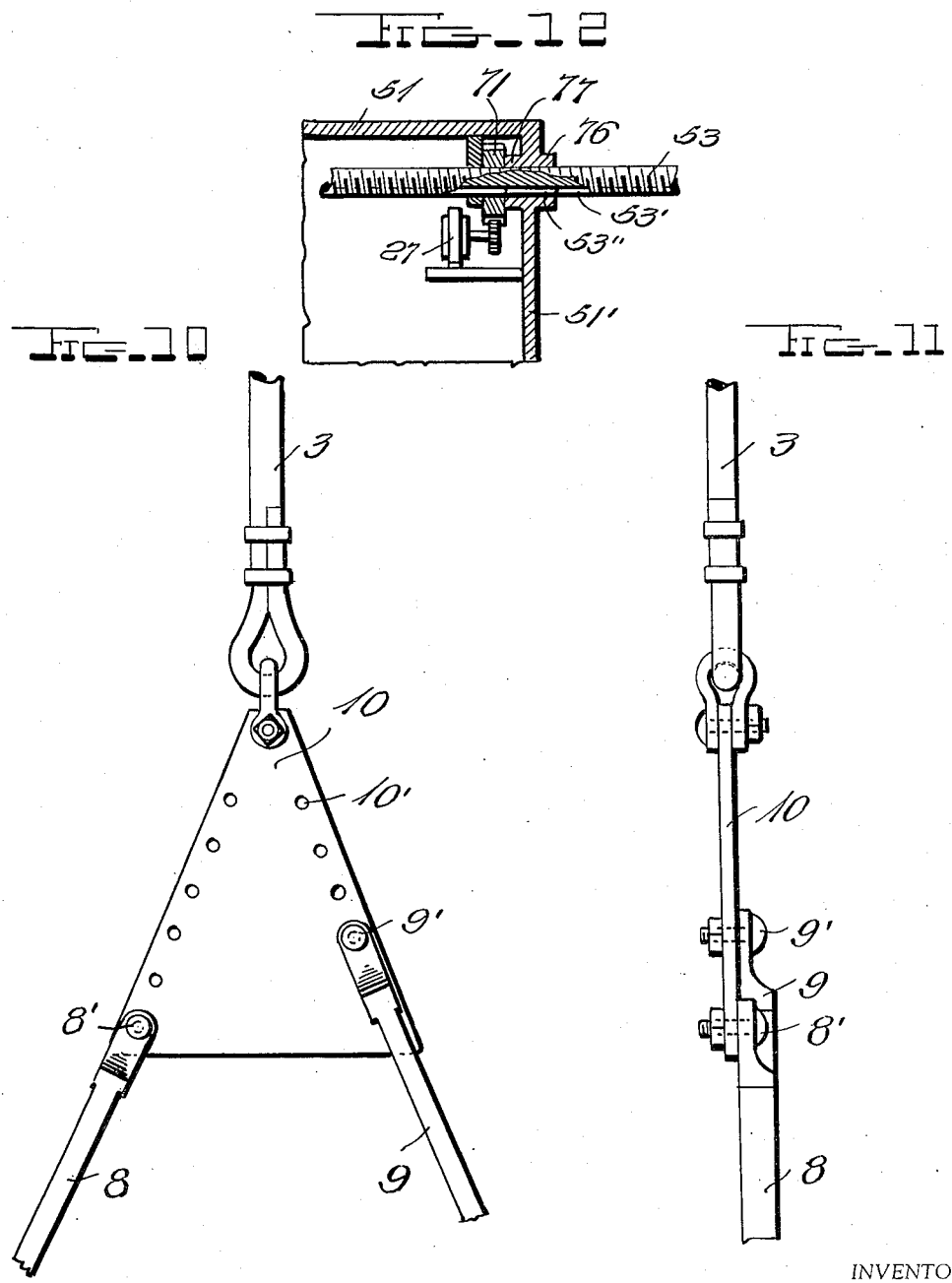

Patented Oct. 21, 1952

2,614,518

UNITED STATES PATENT OFFICE 2,614,518

VESSEL RAISING APPARATUS

William Haviland Carter, Portland, Maine

Application October 15, 1946, Serial No. 703,355

6 Claims. (Cl. 114—51)

My invention relates to the salvaging of sunken vessels by the use of a unique dry dock mechanism, including a plurality or multiplicity of novel means for penetrating the sides of the sunken vessel, whereby the vessel may be lifted to the surface portion of the water.

It is an object of my invention to provide two adjustably spaced dry dock elements adapted to receive water ballast for the purpose of sinking the dry dock elements when properly spaced over the sunken vessel and to accurately engage each side of the vessel.

It is a further object of my invention to provide, on the near or adjacent sides of the dry dock elements, a multiplicity of penetrating devices to penetrate the sides of the sunken vessel and thereby constitute a lifting engagement with the vessel. The penetrating devices, preferably, comprise a multiplicity of motor actuated spring pressed drills arranged to penetrate the sides of the vessel in a multiplicity of closely spaced positions.

It is also an object of my invention to provide a plurality of pumps to pump the water from the dry dock elements whereby the elements become buoyant and thereby lift the penetrated vessel.

It is also an object of my invention to provide a plurality of adjustable spacing means for adjustably connecting the dry dock elements and thereby maintain said elements in properly spaced relation to receive the sunken vessel between the dock elements.

It is also an object of my invention to provide a barge specially constructed to support the cables, generators, winches, etc. The lowering cables are connected to winches located in spaced relation from each other. The electric cables may be supported on self-winding drums so that cable may be paid out or drawn in by the drums automatically.

It is a further object of my invention to provide reinforcing bulk heads, partitions, etc., to afford a multiplicity of motor supports and also to provide suitable manholes in said elements and bulk heads to make it possible to inspect the motors, drills and springs used therewith.

It is also an object of my invention to provide tubular air exits in the dock elements and in the bulk heads for the escape of air when pumping ballast into the dock elements and bulk heads thereof. The air exists are provided with suitable check valves to prevent the entrance of water through said exits.

Other objects and advantages will be revealed in the detailed description of my invention taken in connection with my drawings which form a part of my specification.

In the drawings:

Figure 1 is a schematic side elevational view of my under sea dry dock elements and the barge connected thereto by suitable cables.

Figure 2 is a schematic end elevational view of my combination barge and under sea dry dock elements in engagement with the sides of the sunken vessel.

Figure 3 is a plan view of my dry dock elements in engagement with the sides of the sunken vessel.

Figure 4 is a transverse sectional view taken substantially on the line 4—4 of Figure 5.

Figure 7 is an upright transverse sectional view similar to Figure 6 but showing the position of the drills before penetration of the sunken vessel, but also displaying a further modification of stress and strain supports for the drills.

Figure 8 is an upright transverse sectional view of the barge taken substantially centrally thereof.

Figure 9 is a sectional view of a fragment of my invention showing a captive combined threaded nut and gear element in mesh with the spur gear of one of the space adjusting motors.

Figure 10 is a side elevation of the triangular cable adjusting metal piece or plate including the cables suitably connected thereto.

Figure 11 is an edge elevation of the subject matter of Figure 10; and

Figure 12 is a sectional view similar to Figure 9, showing a groove in one end portion of the screw threaded shaft to receive the spline to prevent the shaft from rotating when the screw threaded gear thereon is rotated to produce a selected adjustment.

Figures 5, 6:
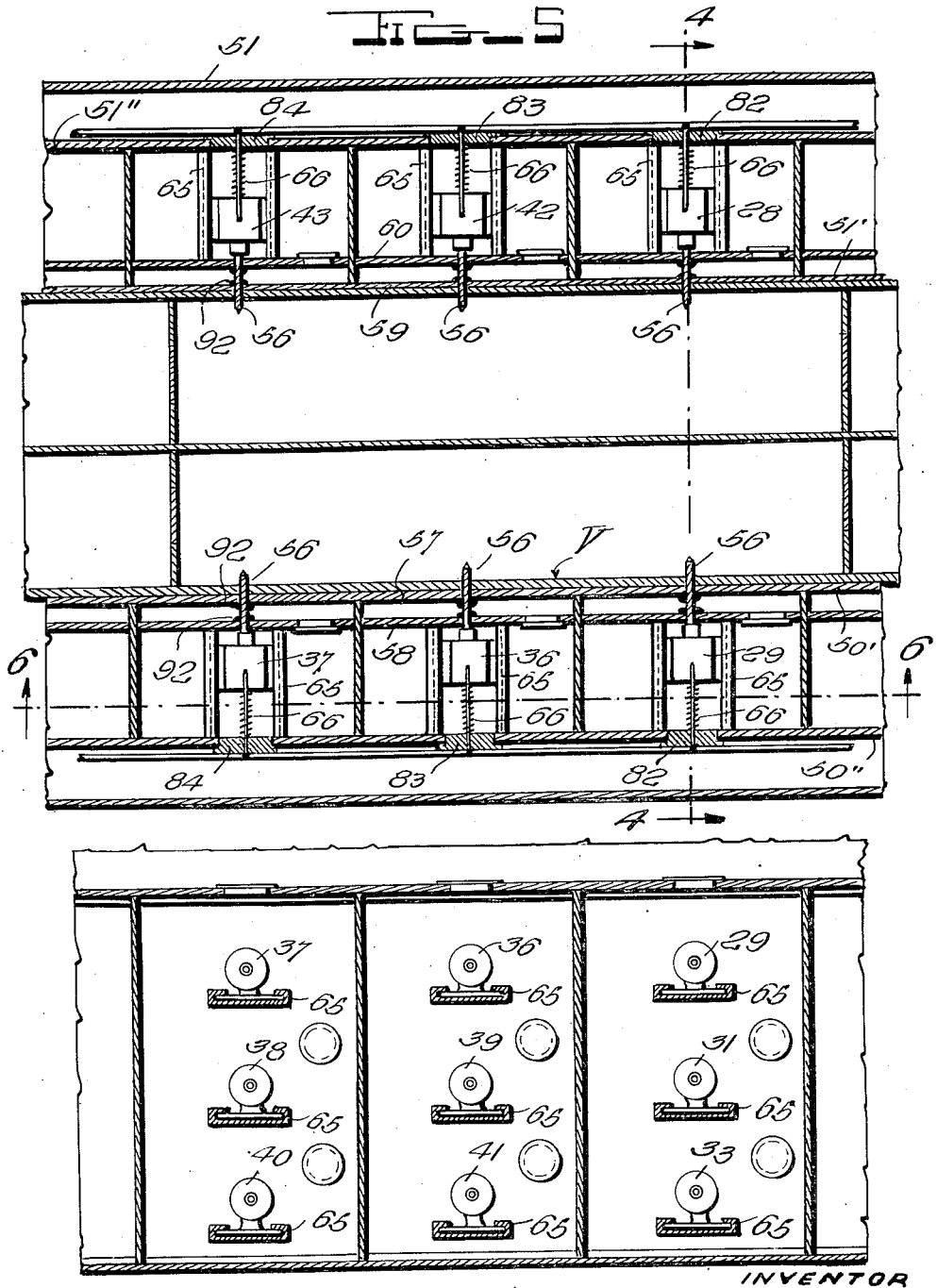
Figure 5 is a longitudinal, horizontal sectional view of a portion of my dry dock elements in engagement with the sides of a sunken vessel taken substantially on the line 5—5 of Figure 4, but displying modified stress and strain supports for the drills.
Figure 6 is an upright longitudinal sectional view of a portion of one of my dry dock elements taken substantially on the line 6—6 of Figure 5, looking in the direction of the arrows.

The drawings are merely illustrative of the essential parts and portions of my invention and not definitive thereof except as set forth in the claimed subject matter herein.

The reference characters identify the details of my invention as disclosed in the drawings and the written description thereof.

In order to use my invention, it is necessary to determine the condition of the sunken vessel by a bathysphere to ascertain its inclination, if any, from a vertical plane so that adjustments may be made to properly guide the dry dock elements to engage accurately the sides of the sunken vessel V.

The barge 1 contains a series or plurality of winches such as are illustrated at 2 in Figure 8. Each winch 2 is connected with a lowering cable as 3, 4, 5, 6, 7, etc. The lowering cables are spaced from each other throughout the length of the barge 1. The space between the lowering cables should not be more than thirty feet. Each lowering cable is provided with a pair of divergent cables 8 and 9. Each main cable as 3, 4, etc., is provided with a plate as 10, 11, 12, etc., including a shackle. The divergent cables 8 and 9 are adjustably attached to the respective plates to control the amount of tilt, list or incline of the dry dock elements to accommodate the reception of an inclined sunken vessel. All of the plates as 10, 11, 12, 13, 14, etc., must have the same adjustment relation of their divergent cables as 8 and 9.

Each cable as 3 is reeved over a swiveled pulley 15. The sets of electric cables 16, 17, 18 may be contained in a single tube instead of a plurality of tubes 19, 20 and 21, as shown in Figure 8. The cables 16, 17, 18 are also reeved over swiveled pulleys 22, 23, and 24. These electric cables 16, 17 and 18 lead into the barge to drums (not shown) located in convenient positions within the barge or on its deck. The tubes 19, 20, 21 and 25, under normal conditions, prevent the entrance of water into the barge 1 since the tubes are secured in a waterproof fashion about the apertures, respectively, in the bottom of the barge and furthermore, the tubes are tall enough to extend amply above the water level outside of the barge.

The sets of electric cables as 16, 17, 18 and their tap branches lead from the drums (not shown) in the barge 1 to electric motors 26 to 43, inclusive, in the dry dock elements.

The dry dock elements 50 and 51 are adjustably connected for selected spacing relation by heavy screw threaded shafts 52 to 55, inclusive, located and extending through the end portions of the dry dock elements as clearly shown in Figures 1, 2 and 3. It will be noted that I have shown four shafts as a suitable number to be used, but it is contemplated that six or eight, etc., could be used if desired.

The diameter of the shafts, as 52, etc., if only four are used, should be of sufficient size to withstand the tremendous strain placed upon them. If more than four shafts are used on the same size of dry dock elements, they may be made correspondingly of lesser diameter in accordance with engineering practice.

In order that my invention may be more readily and mentally visualized, attention is called to the fact that the sunken vessel V may be five hundred and fifty feet (550 ft.) long, consequently the dry dock elements would each have to be substantially 650 feet long so that the threaded shafts 52, 53, etc., would be located clear of and beyond the bow and stern of the sunken vessel V. Supposing the sunken vessel V has sides 33 feet high; that would means the space available for penetration by drills and would be approximately 450 feet by 25 feet which would amount to 11,250 sq. ft. for each side.

In making this calculation 50 feet is allowed for the curved portion of the bow and 50 feet for the curved portion of the stern of the sunken vessel, i. e. 550—(50+50) =450. In connection with the 33 feet sides an allowance of 8 feet is made for irregularities of the sea bottom including the presence of sand or mud or both in addition to inclination of the sunken vessel. I contemplate placing drills approximately one foot apart, provided that, that many would be needed, which would make a grand total of drills contemplated amount to 22,500.

The estimated size of each drill should be one and one-fourth inches in diameter and, at least, six feet long. Of course, the number and size of drills needed could be accurately calculated by applicable engineering practice.

Each drill 56 is connected to and operated by an individual electric motor 28, 29, 30, 31, etc. The sides of the dry dock elements carrying the drills are provided with spaced walls 57, 58, 59 and 60. These walls may be spaced two feet apart and said walls constitute supports for the drills 56. The walls about the apertured portions for the drills are preferably reinforced by the addition of suitably contoured pieces or blocks of steel as indicated by 61, 62, 63 and 64. These reinforcing pieces or blocks may be welded to the walls 57, 58, 59 and 60, as shown in Figure 4.

The dimensions, stated above, are maximum sizes and dimensions but it may be desirable to adopt smaller sizes and dimensions. It appears to be most feasible to consider much smaller sizes. From the engineering standpoint it has been concluded that it is more feasible to use a plurality of screw threaded shafts 52, 53, etc. Four or more could be used on each pair of associated dry dock ends. By increasing the number of shafts above two on each pair of dock ends the sum total of shaft weight could be most favorably reduced, especially in view of the fact that the shafts are widely spaced apart.

It is to be noted, Fig. 2, that the shafts are spaced apart vertically a distance substantially equal to the width of the sunken vessel V. If four or more shafts are used the horizontal spacing could be set at the feasible minimum distance required for good engineering practice. The unengaged part of the shafts located between each pair of ends of the dry docks is substantially as long as the "over all beam" of the sunken ship or vessel V. The over all beam of a vessel is usually a little over one-tenth of its length, therefore a vessel 300 feet long would ordinarily have an all over beam of over 30 feet. Consequently, the unsupported middle zone of each screw threaded shaft would be over 30 feet long. The full length of each shaft would be approximately 100 feet long. It is estimated that the shafts should each have a diameter of 2¼ inches to 2¾ inches to maintan the dry docks in set spaced relation. This maintenance of substantially spaced relation is substantially the sole function of the threaded shafts 52, 53, 54, etc.

The suggested use of a drill 56 in every square foot of area on each side of the sunken vessel V appears to be a maximum quantity and could probably be reduced four or eight fold. It is merely necessary that a sufficient number be used. The number of drills used should be enough to prevent tearing, at the drill holes, of the sheet material of the hull of the sunken vessel.

It is not contemplated that it would be feasible to attempt to salvage a vessel having a list or inclination of more than ten degrees from a vertical line, while in that condition.

Each drilling motor as 28, 29, 30, 31, etc., is mounted on a horizontal guiding support 65 provided with inturned flanges embracing the edges of the motor bases as clearly shown in Figure 6.

Each drill and motor is fed forwardly by heavy compression springs 66. These springs 66 are maintained in operative position by short studs, as clearly shown in Figures 4 and 7.

Each drilling motor is provided with branch leads connecting it with a suitable electric cable, such as 16, 17 and 18.

The width of the sunken vessel V having been ascertained, the dry dock elements 50 and 51 are placed in spaced adjustment corresponding to the width of the sunken vessel V. This adjustment is made by a two step operation involving the use of the threaded shafts 52, 53, 54, etc. The first step constitutes a suitable adjustment, in which both ends of one dock element are simultaneously adjusted relative to the respective oppositely disposed ends of the other dock element, through the medium of threaded gears as 70 and 71, etc, at least, four are contemplated applied in a firmly captive manner in the dock elements and on the threaded shafts, as shown in Figure 4. The gears 70 and 71, etc. are operated simultaneously by four motors 26 and 27, etc. to make the selected adjustment. In my drawings, I have shown a spur gear connection with the threaded gear 70. It is contemplated that a worm and worm wheel construction may be substituted for the spur gear connection. The first selected step of adjustment having been completed, the second step requires the final spacing adjustment of the two dry dock elements 50 and 51 at both ends of the other dry dock element. The adjustment of the dock elements 50 and 51 relative to the threaded shafts 52, 53, etc., is made with substantially duplicate means involving the use of a motor like motor 27 and three others like it (not shown). The motors such as 27 have a spur gear connection with the threaded spur gear like gear 71. The four motors such as 27 are operated simultaneously until the width spacing of the dock elements corresponds to the width of the sunken vessel V.

The tilt list or inclination of the sunken vessel having been ascertained by the use of a bathysphere, the tilt or inclination of my united dry dock elements are adjusted until the dry dock elements are adjusted correspondingly by the shifting of the cables 8 and 9 relative to the triangular plates 10, 11, 12, 13 and 14, shown in Figure 1. These plates are provided with apertures in their top portions for the main cables 3, 4, 5, etc., and each lateral side of the triangular plates is provided with a series of apertures to receive shackle bolts. The shackle bolts 8' and 9' and the apertures 10' and 10" provide for cable adjustments of the cables 8 and 9 to provide for a listing of the dock elements as a unit to correspond to the list or inclination of the sunken vessel. It appears to be self-evident that if each cable 9 is shortened, a like amount and secured on its shackle, the connected dry dock elements will be tilted as a unit; and if the adjustment has been properly made the connected dry dock elements will have a list, tilt or inclination corresponding to the list or inclination of the sunken vessel.

The outside walls of the dry dock elements 50 and 51, which receive the threaded shafts 52, 53, etc., are reinforced by shaft supporting bearings comprising blocks of steel 72, 73, 74, 75, etc., welded thereto.

I have shown the threaded shafts 52, 53, 54 and 55 as having right hand threads throughout the full length of each shaft so that the shafts could be removed entirely from either side of the unit comprising the normally connected dry dock elements 50 and 51.

Since it is essential that the threaded shafts 52, 53, etc., shall not rotate, any suitable means such as splines as clearly shown in Fig. 12 may be used to prevent such rotation. The lower sides of the screw threaded shafts 52, 53, etc., are provided with grooves, such as 53', to receive a spline or splines 53" located on the inner lower side of the reinforcing guide blocks 72, 73, 74, 75, 76, 77, 78 and 79 or any one of them or even a selected number of the blocks.

The reinforced walls which consitute bearings for receiving the shafts 52, 53, etc., may be lubricated by a suitable grease applied to both the shafts and the bearings.

The disconnected electric cables 16, shown at the top of Figure 4, are intended to lead off to any suitable position for making electrical connections where needed.

All the electric motors used are waterproof, i. e. they work under water as well as they do out of water.

Special attention is called to Figure 7 in which the drilling motors 29, 31 and 33 are in retracted position and the compression springs are in a compressed condition and bearing at one end directly against the motors to press them forwardly as soon as the motors and drills are put in operation. The tips of the drills 56 rest against reinforcing plates 79. These plates 79 are welded to the wall $50^1$ of the dry dock element 50, as clearly shown. The reinforcing plates 79 form a longer bearing for each drill and are effective in relieving concentrated strain on both the wall $50^1$ and the drills 56. If the wall $50^1$ is heavy enough, the plates 79 may not be needed, but in such a condition with a heavy wall the drilled apertures may be filled with wooden plugs driven therein to hold the drills back against the compression of the springs 66.

The reinforcing blocks 61, 62, 63 and 64, Fig. 4, represent a modified construction of the reinforcing blocks 79 of Fig. 7. All of these reinforcing blocks are equivalent expedients, in that, they constitute reinforcing means welded to selected portions of wall construction and they serve to prevent undue concentration of stress and strain relative to the walls and to the drills 56. These modified reinforcing blocks contemplate a variety of constructions, one of which may be selected by the engineer constructing my dry dock.

The drills may be made of vanadium steel or of any suitable substitute thereof.

In connection with the walls of the dry dock elements 50 and 51, it is to be noted that all of the walls must be of sufficient thickness and strength to withstand the tremendous strains existing in deep water. It is preferred that the walls be made of any suitable steel or any suitable alloy of steel capable of resisting all stresses and strains in great depths at sea.

Manholes 80, 81, 82, etc., are provided in the bulkheads and partitions of the dry dock elements 50 and 51 to afford access to the motors, drills, etc., for inspection and replacement of parts. In order to remove one of the motors such as 29, one of the guide flanges or a portion thereof may be made removable. When removing a motor as 29, the spring 66 is first removed then the drill 56 is detached from the motor and finally one flange of the guide is removed so that the motor may be removed from its guide 65.

In this connection, it is contemplated that most of the manholes may be placed in the walls $50^{11}$ and $51^{11}$ and they may be placed for the most part directly back of the motors 28, 29, 30, 31, etc., so that the motors and drills could be removed backwardly through the manholes. When the motors, drills and springs are replaced, the springs could be supported in place over the manholes by flat bars (not shown) each having a positioning stud to engage and position the rear end of the spring in alignment with the motor.

When the dry dock elements 50 and 51 are in position one on each side of the sunken vessel V and the drills 56 have penetrated the sides of the vessel then it is time to apply the lifting power to the elements 50 and 51 and likewise to the sunken vessel through the medium of the multiplicity of the penetrated drills. In order to provide the lifting power, through the medium of buoyancy imparted to the elements 50 and 51, the water ballast must be pumped from the elements. For this purpose, I have provided a plurality of reversible pumps 86 and 87, two of which are shown in Fig. 4 and one in Fig. 7. The motor 34 and the motor 35 are connected directly and respectively with pumps 86 and 87, Figs. 4 and 7. I contemplate using any suitable variety of pumps that will successfully remove the ballast from the elements 50 and 51. I also contemplate the use of air compressors and generators to assist the pumps in pumping out the ballast. The compressors (not shown) would be operated by electric motors. The compressors will produce air pressure within the elements 50 and 51 and their bulk head compartments. The pumps are propelled by electric motors 34 and 35 operatively connected to pumps 86 and 87.

The motors 34 and 35 are provided with remote control means located in the barge 1.

The lower adjacent longitudinal edges 90 and 91 are and should be rounded in long sweeping curves to aid in guiding the united elements 50 and 51 over the top edges of the sunken vessel.

Because of the lack of space on the regulation size of my drawings, it has been impossible to disclose a multiplicity of motors and drills such as contemplated in actual use.

In operating my novel mechanism, it is contemplated that the barge 1 containing its sets of winches, drums and cables and all other necessary equipment, including a bathysphere, will be moved by a tug or otherwise, together with the dry dock elements, to a position directly over the sunken vessel V. If it is feasible to mark the position of the sunken vessel by floats, it should be done initially to facilitate the positioning of the connected elements 50 and 51 directly over the sunken vessel. If the elements 50 and 51 have already been adjusted for the width of the sunken vessel, this adjustment should be checked to determine if it is still correct and if not it should be readjusted accurately to the correct spacing.

All cable connections between the barge and the elements 50 and 51 should be carefully made. When the dock elements 50 and 51 are carefully placed in the desired position, the barge should be moved to one side of the connected dock elements but previously to moving the barge 1 to one side of the dock elements ample cable should be carefully paid out so that the dock elements will not be disturbed. In making the cable connections, the inclination adjustment of the sets of cables 8 and 9 should be carefully made to produce the desired results. All of the cables having been properly connected and secured and proper relative positions of dock elements and barge maintained then the dock elements are ready to be slowly sunk by the admission of water thereto through sea cocks or pumps preferably controlled by electric motors located on the dock elements. It is now desired that the dock elements be gradually lowered under the watchful eye of the bathysphere. The descent of the dock elements can be signaled from the bathysphere. It is contemplated that the dock elements may be jockeyed to a more nearly perfect position by the lowering cables connected to the barge 1. When the walls of the dock elements 50 and 51 are strong enough, then the walls 57, 58, 59 and 60 need no reinforcing blocks, but rubber washers 92 can be used as clearly shown in Fig. 5 to prevent undue leakage. Fig. 5 to the extent above indicated represents a modified construction different from that disclosed in Figs. 4 and 7.

In order to prevent leakage into the dock elements and their bulk heads, conical rubber washers 92 may be applied to the drills 56. The washers 92 should be located on the drills 56 and having their bases securely attached to the walls 57, 58, 59 and 60, as shown in Figure 5.

From the foregoing description of the construction of my improved under sea dry dock, the method of applying same to use will be readily understood, and it will be seen that I have provided a comparatively simple, inexpensive and efficient means for carrying out the various objects of the invention. While I have described the elements best adapted to perform the functions set forth, it is apparent that various changes in form, proportion and in the minor details of construction may be resorted to, without departing from the spirit thereof or sacrificing any of the principles of the invention.

Having thus described my invention, what I claim is:

1. Equipment for salvaging vessels sunken in deep sea positions, said equipment comprising a barge in combination with adjustably connected oppositely disposed dry dock elements, said barge and dock elements being connected by controlling cables suspended from said barge, said cables being respectively connected to separate winches located on the deck of said barge, electric cables leading from said barge to electric motors located in said dock elements, a plurality of screw threaded shafts, said shafts connecting the respectively oppositely disposed ends of said dock elements and extending transversely therethrough, the arrangement and location of said threaded shafts being in positions clear of and beyond the bow and stern, respectively, of a sunken vessel to be lifted, said threaded shafts in each pair of dock element ends being located in spaced relation above and below the horizontal longitudinal central plane of said dock elements, captive screw threaded gears mounted in said dock elements and on said screw threaded shafts, electric motors mounted in said dock elements and having gears, each respectively meshing with the captive gears whereby said captive gears may be actuated to adjust the shafts relative to the dock elements, said electric motors being controlled through said electric cables, said dock elements being provided with bulkheads and partitions to reinforce said dock elements, a multiplicity of drilling motors and supports therefor mounted within the respective dock elements and adjacent the inner sides thereof, each of said drilling motors carrying a penetrating drill adapted to penetrate the side of a sunken vessel located between said dock elements, said supports comprising guides to direct the respective motors and their drills forwardly, means interposed between the bulkheads and the respective motors to urge them forwardly when actuated, control means for the drilling motors located in said barge whereby the drills may be actuated to penetrate the sides of a sunken vessel, pumps in said elements to pump the ballast out of the dock elements and thereby impart buoyant quality to the dock elements whereby a penetrated sunken vessel located between said dock elements may be lifted to a floating condition near said barge, said pumps being provided with electric motors having control means located in said barge.

2. Equipment for salvaging vessels sunken in deep sea positions, said equipment comprising a barge in combination with adjustably connected oppositely disposed dry dock elements, said barge and dry dock elements being connected by controlling cables suspended from said barge, said cables being respectively connected to separate winches located on the deck of said barge, electric cables leading from said barge to electric motors located in said dry dock elements, a plurality of screw threaded shafts, said shafts connecting the respectively oppositely disposed ends of said dock elements and extending transversely therethrough, the arrangement and location of said shafts being in positions clear of and beyond the bow and stern, respectively of a sunken vessel to be lifted, said threaded shafts in each pair of dock element ends being located in spaced relation and in substantially parallel upright planes, captive screw threaded gears mounted in said dock elements and on said screw threaded shafts, electric motors mounted in said dock elements and having gears, each respectively meshing with the captive gears whereby said captive gears may be actuated to adjust the shafts relative to the dock elements, said electric motors being controlled through said electric cables, said dock elements being provided with bulkheads and partitions to reinforce said dock elements, a multiplicity of drilling motors and supports therefor mounted within the respective dock elements and adjacent the inner sides thereof, each of said drilling motors carrying a penetrating drill adapted to penetrate the side of a sunken vessel located between said dock elements, said supports comprising guides to direct the respective motors and their drills forwardly, means interposed between the bulkheads and the respective motors to urge them forwardly when actuated, control means for the drilling motors located in said barge whereby the drills may be actuated to penetrate the sides of a sunken vessel, pumps in said elements to pump the ballast out of the dock elements and thereby impart buoyant quality to the dock elements whereby a penetrated sunken vessel located between said dock elements may be lifted to a floating condition near said barge, said pumps being provided with electric motors having control means located in said barge.

3. The construction set forth in claim 2, in which said drills are initially located entirely within said dry dock elements.

4. The construction set forth in claim 2, in which the drills of each dry dock element are supported substantially in parallel relation to each other and both dry dock elements maintain all of the drills in substantially rectilinear relation to each other whereby said drills may be propelled forwardly in rectilinear paths.

5. The construction set forth in claim 2, in which said dock elements are provided with stress and strain supports welded to the inner opposed sides of the dock elements adapted to be engaged by said drills in the operation thereof.

6. The construction set forth in claim 2, in which said controlling cables are provided with upright triangular plates suspended by said cables by articulate connection to one corner thereof, said triangular plates having a series of apertures adjacent their upright divergent edges, divergent auxiliary cables respectively connected at their upper ends to the divergent edges at a selected apertured portion thereof, the lower ends of said auxiliary cables being connected respectively to said dry dock elements whereby the list of the dry dock elements may be adjusted to correspond to the list of a sunken vessel.

WILLIAM HAVILAND CARTER.

REFERENCES CITED

The following references are of record in the file of this patent:

UNITED STATES PATENTS

| Number | Name | Date |
|---|---|---|
| 1,373,574 | Swaney | Apr. 5, 1921 |

FOREIGN PATENTS

| Number | Country | Date |
|---|---|---|
| 150,469 | Great Britain | Sept. 9, 1920 |